(12) United States Patent
Koreeda et al.

(10) Patent No.: US 9,176,287 B2
(45) Date of Patent: Nov. 3, 2015

(54) CONNECTOR AND PLUG THAT INCORPORATES SAME

(71) Applicant: JAPAN AVIATION ELECTRONICS INDUSTRY, LIMITED, Tokyo (JP)

(72) Inventors: Yuichi Koreeda, Tokyo (JP); Naoki Katagiyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/624,885

(22) Filed: Feb. 18, 2015

(65) Prior Publication Data

US 2015/0268424 A1 Sep. 24, 2015

(30) Foreign Application Priority Data

Mar. 24, 2014 (JP) .................................. 2014-059483

(51) Int. Cl.
*G02B 6/38* (2006.01)
*G02B 6/26* (2006.01)
*G02B 6/36* (2006.01)

(52) U.S. Cl.
CPC ............ *G02B 6/3893* (2013.01); *G02B 6/3825* (2013.01); *G02B 6/26* (2013.01); *G02B 6/262* (2013.01); *G02B 6/36* (2013.01); *G02B 6/381* (2013.01); *G02B 6/3807* (2013.01); *G02B 6/389* (2013.01); *G02B 6/3897* (2013.01)

(58) Field of Classification Search
CPC ............ G02B 6/26; G02B 6/262; G02B 6/36; G02B 6/3807; G02B 6/381; G02B 6/3825; G02B 6/389; G02B 3/3893; G02B 6/3897

USPC .................. 385/53–56, 60, 62, 88, 89, 94
See application file for complete search history.

(56) References Cited

U.S. PATENT DOCUMENTS

| | | | |
|---|---|---|---|
| 7,074,066 B2 * | 7/2006 | Pepe | 439/321 |
| 7,744,288 B2 * | 6/2010 | Lu et al. | 385/60 |
| 2001/0036762 A1 * | 11/2001 | Payson et al. | 439/320 |
| 2011/0211792 A1 * | 9/2011 | Koreeda et al. | 385/60 |
| 2012/0308183 A1 * | 12/2012 | Irwin et al. | 385/56 |
| 2014/0334778 A1 * | 11/2014 | Walker et al. | 385/59 |
| 2015/0147033 A1 * | 5/2015 | Coggi et al. | 385/76 |
| 2015/0177463 A1 * | 6/2015 | Lee et al. | 385/60 |
| 2015/0177469 A1 * | 6/2015 | Nadeau | 385/60 |

FOREIGN PATENT DOCUMENTS

JP 2011-180238 9/2011

* cited by examiner

*Primary Examiner* — Ryan Lepisto
*Assistant Examiner* — Guy Anderson
(74) *Attorney, Agent, or Firm* — Greenblum & Bernstein, P.L.C.

(57) ABSTRACT

A connector of the present invention comprises a sleeve, a latch, a stopper, a slider, a pressing projection, and a slider impelling section. The latch has locking projections that provide on both sides at the back end thereof in the transverse direction and a notch formed from the back end toward the front end of the latch. The slider is disposed behind the sleeve in the insertion direction so as to be able to move backward in the insertion direction with respect to the stopper. The pressing projection is disposed at the position of the notch in the latch and is securely coupled with the slider by means of a coupling section penetrating the notch. The slider impelling section presses the slider toward the stopper in the insertion direction.

12 Claims, 8 Drawing Sheets

CONNECTOR AND PLUG THAT INCORPORATES SAME

BACKGROUND OF THE INVENTION

1. Field of the Invention

The present invention relates to a connector that can be detached from an adapter in a single operation and to a plug that incorporates the connector.

2. Description of the Related Art

A known optical connector is shown in FIG. 1. The illustrated optical connector complies with IEC 61754-20. This optical connector 800 includes a sleeve 810 and a latch 820. The sleeve 810 has a ferrule, which is not shown in the figure, disposed at the front end in the insertion direction. The latch 820 is formed in one face of the sleeve 810. The front end 821 of the latch 820 in the insertion direction into an adapter, which is not shown in the figure, is a fixed end, and the back end 822 thereof is a free end. The latch 820 extends in a direction such that it is separated gradually from the face and has locking projections 825 that protrude at a middle position on both sides in the transverse direction. The optical connector 800 is latched in the adapter when the locking projections 825 are placed in latching sections of the adapter. The optical connector 800 is released generally by pressing the back end 822 of the latch 820 of the optical connector 800 onto the sleeve side with a finger to detach the optical connector 800 from the adapter.

A plug that incorporates such an optical connector is disclosed in Patent Literature 1 (Japanese Patent Application Laid Open No. 2011-180238). The plug allows the optical connector to be detached from the adapter in a single operation. FIG. 2 shows FIG. 2 of Patent Literature 1. The figure is taken directly from Patent Literature 1. Therefore, the reference numerals in the figure are those used in Patent Literature 1 and differ from the reference numerals used in this description. For example, reference numerals 10 and 14 in Patent Literature 1 correspond respectively to reference numerals 800 and 820 in FIG. 1. In the technology disclosed in Patent Literature 1, a latch is also formed in one face of the optical connector. The front end thereof in the insertion direction into the adapter is a fixed end; the back end thereof is a free end; and the latch extends in a direction such that it is separated gradually from this face and has locking projections that protrude at a middle position on both sides in the transverse direction. When the optical connector is detached, a force should be applied to pull the plug. This force generates a force that presses the back end of the latch until it is released.

SUMMARY OF THE INVENTION

The structure of the plug in Patent Literature 1 makes it difficult to reduce the diameter of the plug, because the length of the latch determines the diameter.

An object of the present invention is to provide a connector that can be detached in a single operation and that can be reduced in diameter.

A connector of the present invention is inserted into an adapter for connection therewith. The connector comprises a sleeve, a latch, a stopper, a slider, a pressing projection, and a slider impelling section. The latch is formed in one face of the sleeve, and comprises a front end in the insertion direction into the adapter serving as a fixed end, a back end serving as a free end, locking projections that protrude on both sides in the transverse direction in the back end, and a notch formed from the back end toward the front end. The stopper is disposed behind the sleeve in the insertion direction and is securely coupled with the sleeve. The slider is disposed behind the sleeve in the insertion direction so as to be able to move backward in the insertion direction by a given distance with respect to the stopper. The pressing projection is disposed at the position of the notch on the other side of the latch with respect to the one face and is securely coupled with the slider by means of a coupling section penetrating the notch. The slider impelling section presses the slider toward the stopper in the insertion direction. When the connector is connected, the latch is pressed down by pressing sections provided in the adapter, returns to its original state after the locking projections pass through the pressing sections, and is locked in the adapter when the locking projections are positioned at latching sections formed behind the pressing sections. When the connector is detached from the adapter, the slider should be moved backward in the insertion direction against the pressing force applied by the slider impelling section, causing the pressing projection to press down the latch to release the locking in the adapter.

In the connector of the present invention, the latch has the notch, and the coupling section penetrating the notch securely couples the pressing projection disposed in the front (on the other side with respect to the face) of the latch in the insertion direction and the slider disposed backward in the insertion direction. The locking projections protrude from the mechanism (the pressing projection, the coupling section, and the slider) that presses the latch, and the mechanism that presses the latch does not disturb the insertion of the optical connector into the adapter. As the slider is moved backward in the insertion direction, the latch that is hidden in the adapter in the connected state is pushed down. By moving the slider backward in the insertion direction further, the connector is detached. The latch has the locking projections and the notch in the back end. No other components need to be disposed farther from the one face than the locking projections. Therefore, the connector can be detached in a single operation and can be reduced in diameter.

DETAILED DESCRIPTION OF THE PREFERRED EMBODIMENTS

Figure 1:
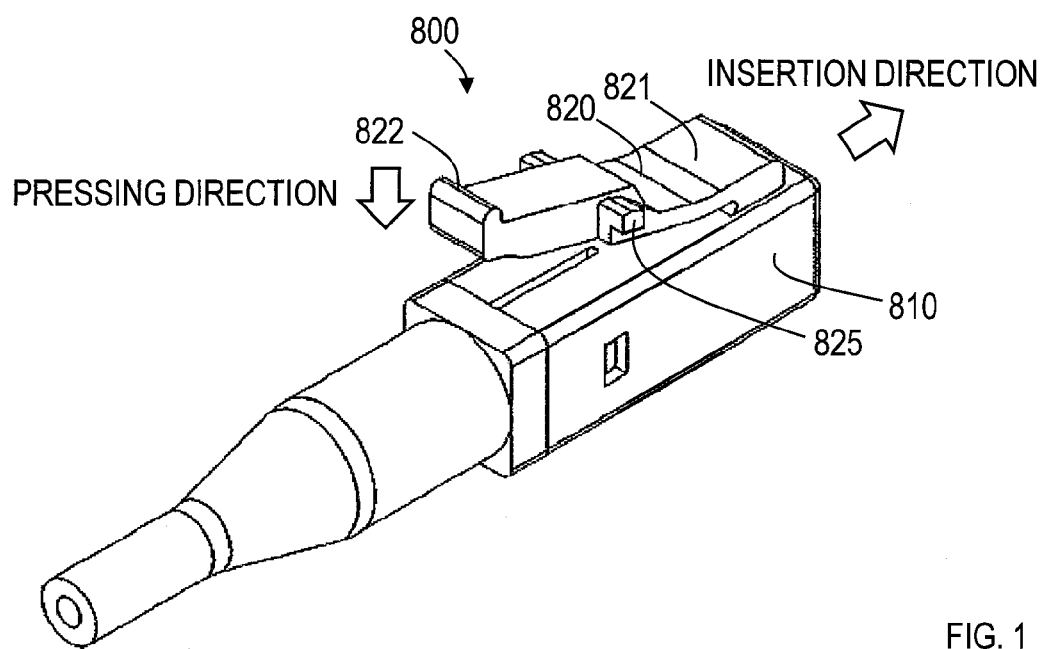
FIG. 1 shows a conventional optical connector.

Embodiments of the present invention will be described in detail below. Components having identical functions will be denoted by the same reference numerals, and repeated descriptions of those components will be omitted.

First Embodiment

Analysis

To connect the conventional optical connector 800 shown in FIG. 1 to an adapter, the locking projections 825 need to be inserted into the latching sections of the adapter. The connected state will be released when the back end 822 and the sleeve 810 are held tightly between two fingertips. This means that the back end 822 of the latch 820 should be outside the adapter in the connected state and that the locking projections 825 should be pressed down by force as low as that applied when two fingertips are used to hold tightly. The same types of latches are used in telephone line connectors and LAN connectors. The technology disclosed in Patent Literature 1 also uses the structure of the latch 820, and the back end 822 of the latch 820 is outside the adapter in the connected state. Accordingly, the back end 822 of the latch 820 needs to be pressed by a mechanism that presses the latch 820 and that is disposed behind the locking projections 825 in the insertion direction. The mechanism that presses the latch in Patent Literature 1 is designed to press the latch (reference numeral 14 in FIG. 2) with a clip (reference numeral 15 in FIG. 2) disposed to cover the back end of the latch.

Assuming that the structure of adapters used in many transmission apparatuses cannot be changed, the positions of locking projections cannot be changed. To set the locking projections at the back end (to eliminate the part behind the locking projections), the mechanism that presses the latch is required to meet the following conditions:

- Since the locking projections need to be inserted into the adapter, the locking projections should stick out of the mechanism that presses the latch.
- The mechanism should not obstruct the insertion of the optical connector into the adapter.
- The latch that is hidden in the adapter in the connected state should be pressable.

The mechanism disclosed in Patent Literature 1 does not meet those conditions and is not usable. The point of effort where the latch is pressed should become close to the front end (fixed end, corresponding to the fulcrum) of the latch, and a force greater than the force applied to press the conventional back end 822 should be applied.

Figure 2:
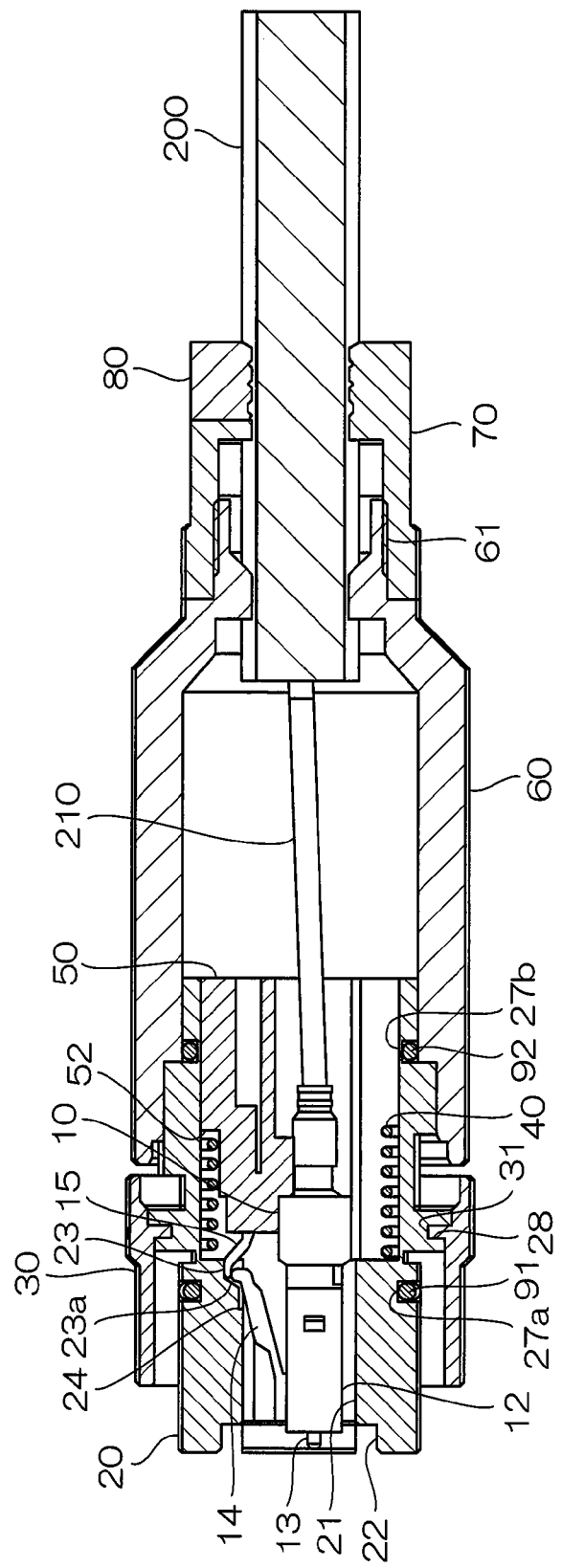
FIG. 2 shows a plug that incorporates an optical connector, shown in FIG. 2 of Patent Literature 1.

The plug that incorporates the connector, shown in FIG. 2, is used to connect to an outdoor transmission facility. A member disposed behind the connector in the insertion direction is held in the hand and is pulled. In other words, a force greater than the force that would be applied when fingertips are used to hold tightly can be applied easily. In those types of connectors to which a great force can be applied easily, such as the connector that can be detached from the adapter in a single operation, force problems can be solved even if the latch is shortened until the locking projections are at its back end. The present invention pays attention to this point and embodies a plug that incorporates a connector which can be detached in a single operation and which can be reduced in diameter, by changing the structure of the latch and the way of transferring the force applied to press the latch.

Specific Structure

Figure 3:
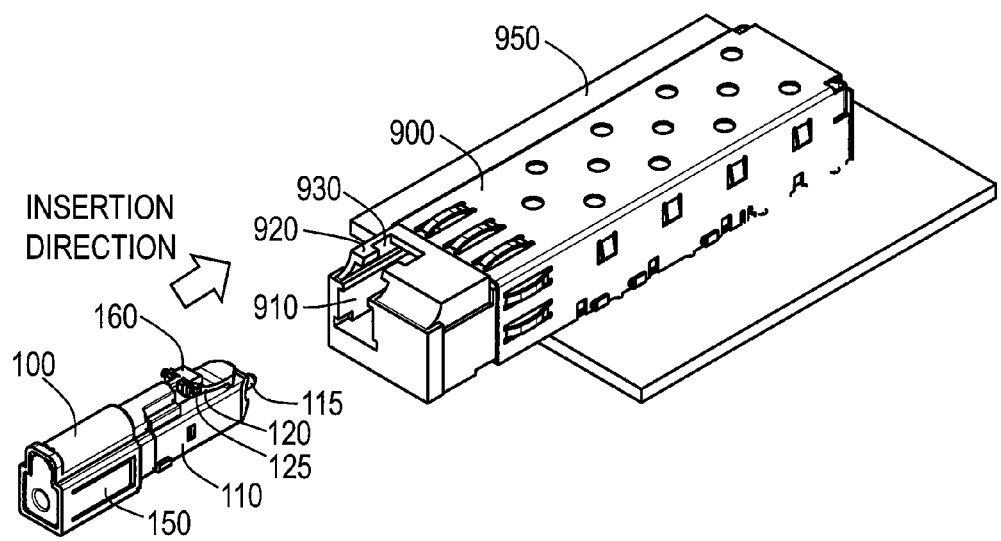
FIG. 3 is a perspective view showing an optical connector 100 and a module 900 having an adapter 910.
Figure 4:
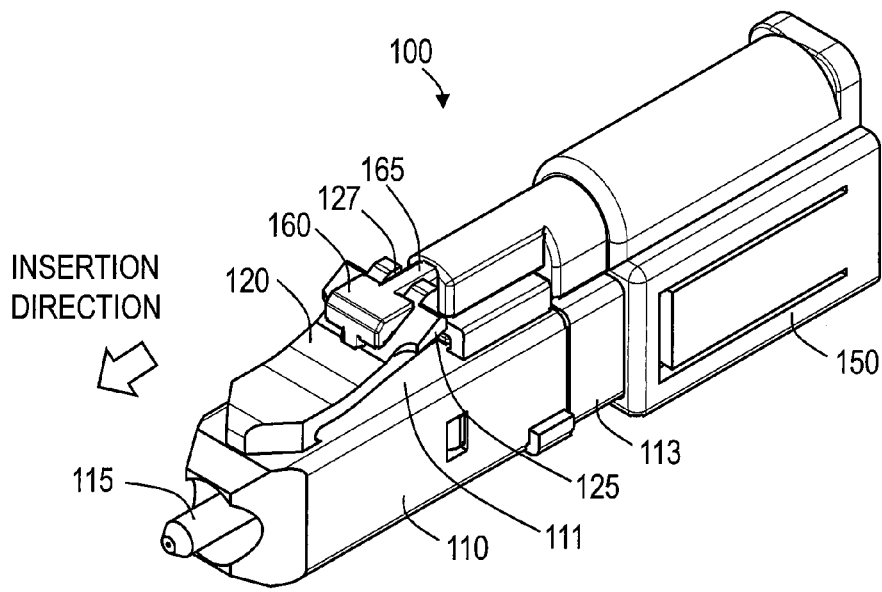
FIG. 4 is a perspective view showing an external appearance of the optical connector 100.
Figure 5:
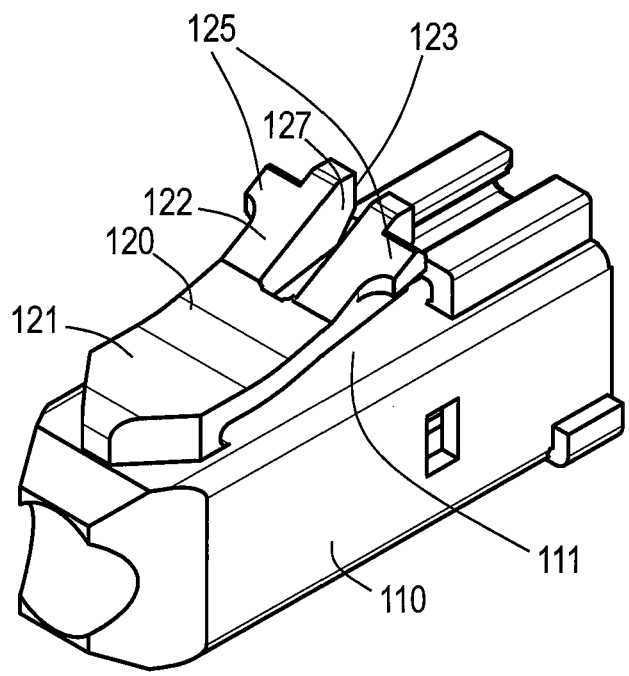
FIG. 5 is a perspective view showing external appearances of a sleeve 110 and a latch 120 of the optical connector 100.
Figure 6:
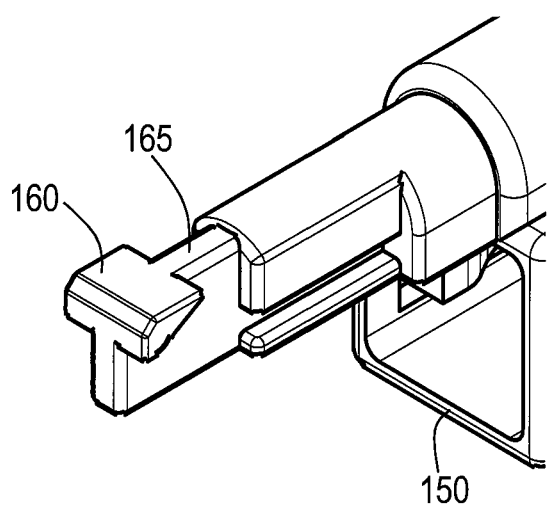
FIG. 6 is a perspective view showing external appearances of a pressing projection 160 and a coupling section 165 of the optical connector 100.
Figure 7:
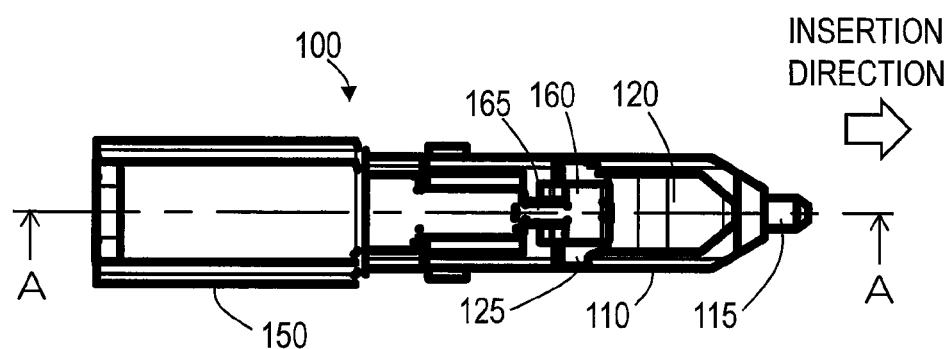
FIG. 7 is a plan view showing an external appearance of the optical connector 100.
Figure 8:
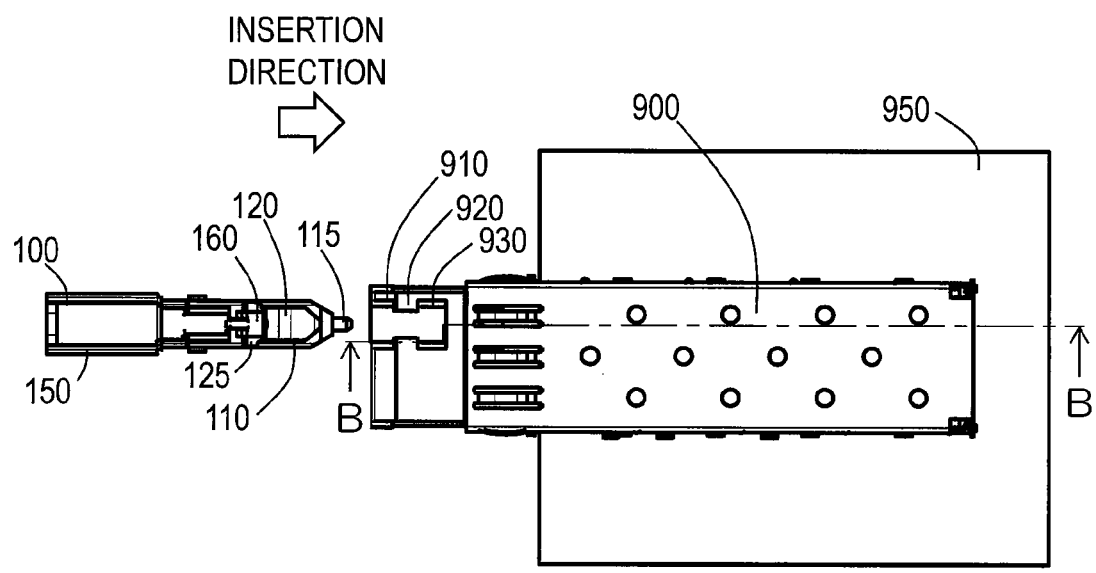
FIG. 8 is a plan view showing the optical connector 100 and the module 900.
Figure 9:
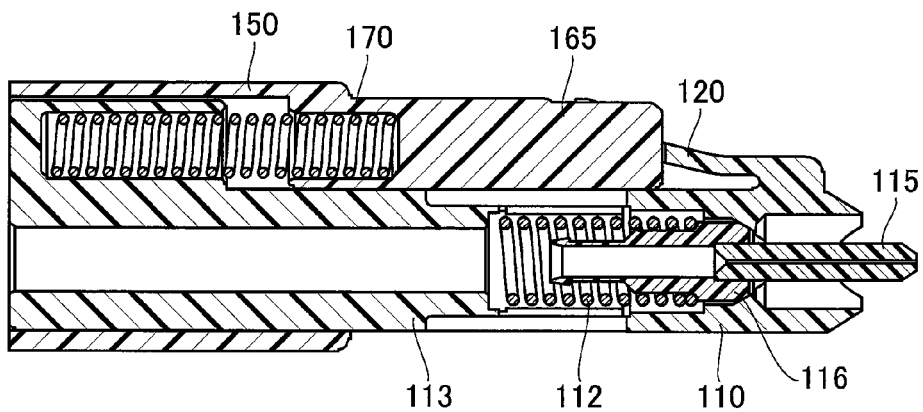
FIG. 9 is a sectional view of the optical connector 100 taken along line A-A in FIG. 7.
Figure 10:
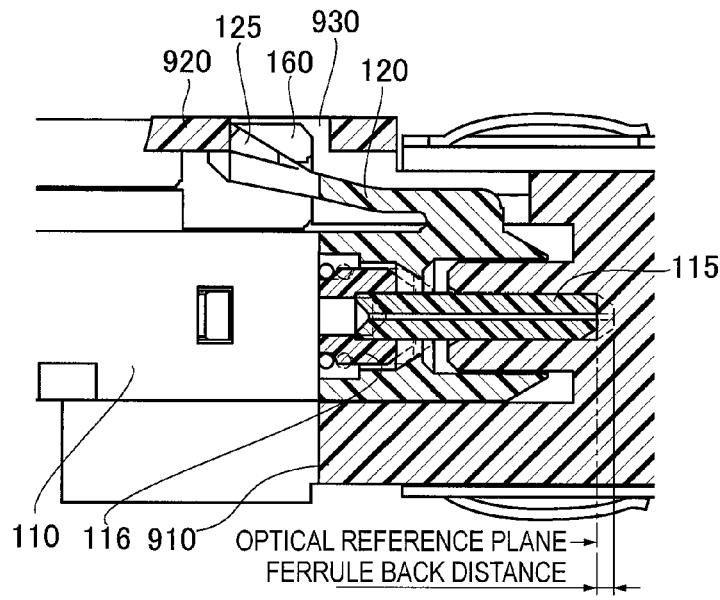
FIG. 10 is a sectional view of the optical connector 100 taken along line B-B in FIG. 8 when it is connected to the adapter 910.
Figure 11:
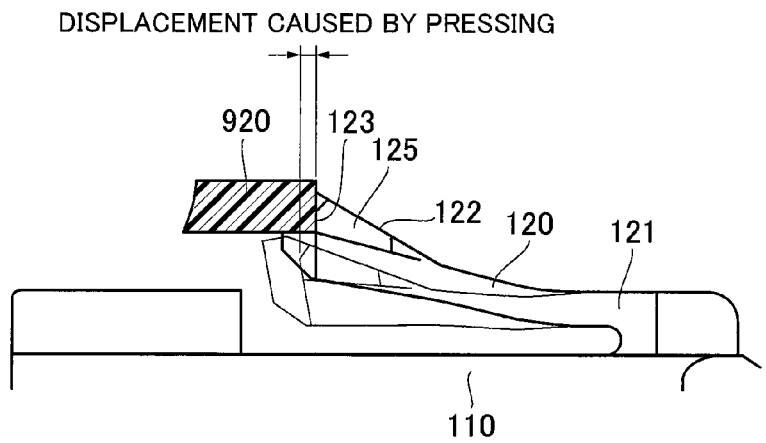
FIG. 11 illustrates the relationship between the latch 120 and a pressing section 920.

FIG. 3 is a perspective view showing an optical connector 100 and a module 900 having an adapter 910. FIG. 4 is a perspective view showing an external appearance of the optical connector 100. FIG. 5 is a perspective view showing external appearances of a sleeve 110 and a latch 120 of the optical connector 100. FIG. 6 is a perspective view showing external appearances of a pressing projection 160 and a coupling section 165 of the optical connector 100. FIG. 7 is a plan view showing an external appearance of the optical connector 100. FIG. 8 is a plan view showing the optical connector 100 and the module 900. FIG. 9 is a sectional view of the optical connector 100 taken along line A-A in FIG. 7. FIG. 10 is a sectional view of the optical connector 100 taken along line B-B in FIG. 8 when it is connected to the adapter 910. FIG. 11 illustrates the relationship between the latch 120 and a pressing section 920.

The module 900 is a component included in transmission apparatuses, is disposed on a printed circuit board 950 as shown in FIG. 3, for example, and has the adapter 910. The adapter 910 comprises pressing sections 920 and latching sections 930. The adapter shown in FIGS. 3, 8, and 10 comply with IEC 61754-20 but should not be limited to that type. The optical connector 100 comprises the sleeve 110, a ferrule 115, a ferrule holding section 116, a ferrule impelling section 112, the latch 120, a stopper 113, a slider 150, the pressing projection 160, and a slider impelling section 170. The ferrule 115 that houses the optical fiber and the ferrule holding section 116 for holding the ferrule 115 are disposed in the sleeve 110.

The latch 120 is formed on one face 111 of the sleeve 110. The front end 121 of the latch 120 in the insertion direction into the adapter 910 is a fixed end; and the back end 123 thereof is a free end. The latch 120 has locking projections 125 that protrude on both sides in the transverse direction at the back end 123 and a notch 127 formed from the back end 123 toward the front end 121.

The stopper 113 is disposed behind the sleeve 110 in the insertion direction and is securely coupled with the sleeve 110. The ferrule impelling section 112 is disposed between the stopper 113 and the ferrule holding section 116, and the ferrule impelling section 112 allows the ferrule 115 to move backward in the insertion direction and keeps the ferrule 115 pressed forward in the insertion direction. More specifically, while the optical connector 100 is not connected to the adapter 910, the ferrule 115 is placed in the forwardmost position in the insertion direction within its movable range (FIG. 9 is a sectional view showing the ferrule 115 in the forwardmost position in the insertion direction). While the optical connector 100 is connected to the adapter 910, the ferrule 115 butts against the optical reference plane in the module 900 and is kept at the position backward in the insertion direction by the ferrule back distance, as shown in FIG. 10. This state generates a pressing force between the ferrule 115 and the module 900 and also between the locking projections 125 and the pressing sections 920. As shown in FIG. 11, when a pressing position 122 is pressed toward the face 111, the latch 120 is pressed toward the face 111, causing the sleeve 110 to move in the insertion direction by the displacement caused by pressing. This increases the pressing force between the locking projections 125 and the pressing sections 920 generated in the connected state. The direction in which the latch 120 is pressed is the direction in which the force generated by the ferrule impelling section 112 increases, so that the connection of the optical connector 100 and the adapter 910 cannot be released easily. The ferrule impelling section 112 can be a coil spring, as shown in FIG. 4.

The slider 150 is disposed in the rear of the sleeve 110 in the insertion direction such that it can be moved backward in the insertion direction by a given distance with respect to the stopper 113. When the slider 150 is moved backward in the insertion direction, the pressing projection 160 pushes the latch 120, which will be described later. Accordingly, the above given distance should be set to a level not falling below the distance of movement of the slider 150 that is required to release the locking projections 125 from the pressing sections 920. The pressing projection 160 is disposed at the position of the notch 127 on the opposite side of the face 111 with respect to the latch 120 (in the insertion direction side of the latch 120) and is securely coupled to the slider 150 by means of the coupling section 165 penetrating the notch 127. The slider impelling section 170 presses the slider 150 in the insertion direction with respect to the stopper 113. While the pressing projection 160 is positioned in the forwardmost position in the insertion direction, the pressing projection 160 does not apply a force to press the latch 120. The slider impelling section 170 can be, but should not be limited to, a coil spring, as shown in FIG. 9.

When the slider 150 moves backward in the insertion direction with respect to the stopper 113, the pressing projection 160 also moves backward in the insertion direction, generating a force that pushes the pressing position 122 of the latch 120 toward the face 111. If the force is large enough, the latch state of the locking projections 125 and the adapter 910 is released. Since the front end 121, the pressing position 122, and the back end 123 shown in FIG. 11 correspond respectively to the fulcrum, the point of effort, and the point of application, the pressing position 122 must be pressed with a force greater than the force that would be applied to the conventional long latch. The slider 150, however, is not held tightly by just the fingertips but can be held by whole fingers, so that a force can be applied thereto easily. If the slider 150 is larger than the one shown in FIG. 4, or if the optical connector 100 is incorporated in a plug as in Patent Literature 1 and the plug is held and pulled, a force could be applied more easily. The specific size and shape of the slider 150 should be determined appropriately after consideration of the required force and ease of applying a force. Depending on the force applied by the pressing projection 160, a force is applied to the coupling section 165 in the direction in which it is separated from the face 111. Therefore, the coupling section 165 should be longer in the height direction, which is perpendicular to the face 111, than in the width direction, which is parallel to the face 111 and perpendicular to the insertion direction, as shown in FIG. 6.

Figures 12A, 12B, 12C, 12D, 12E:
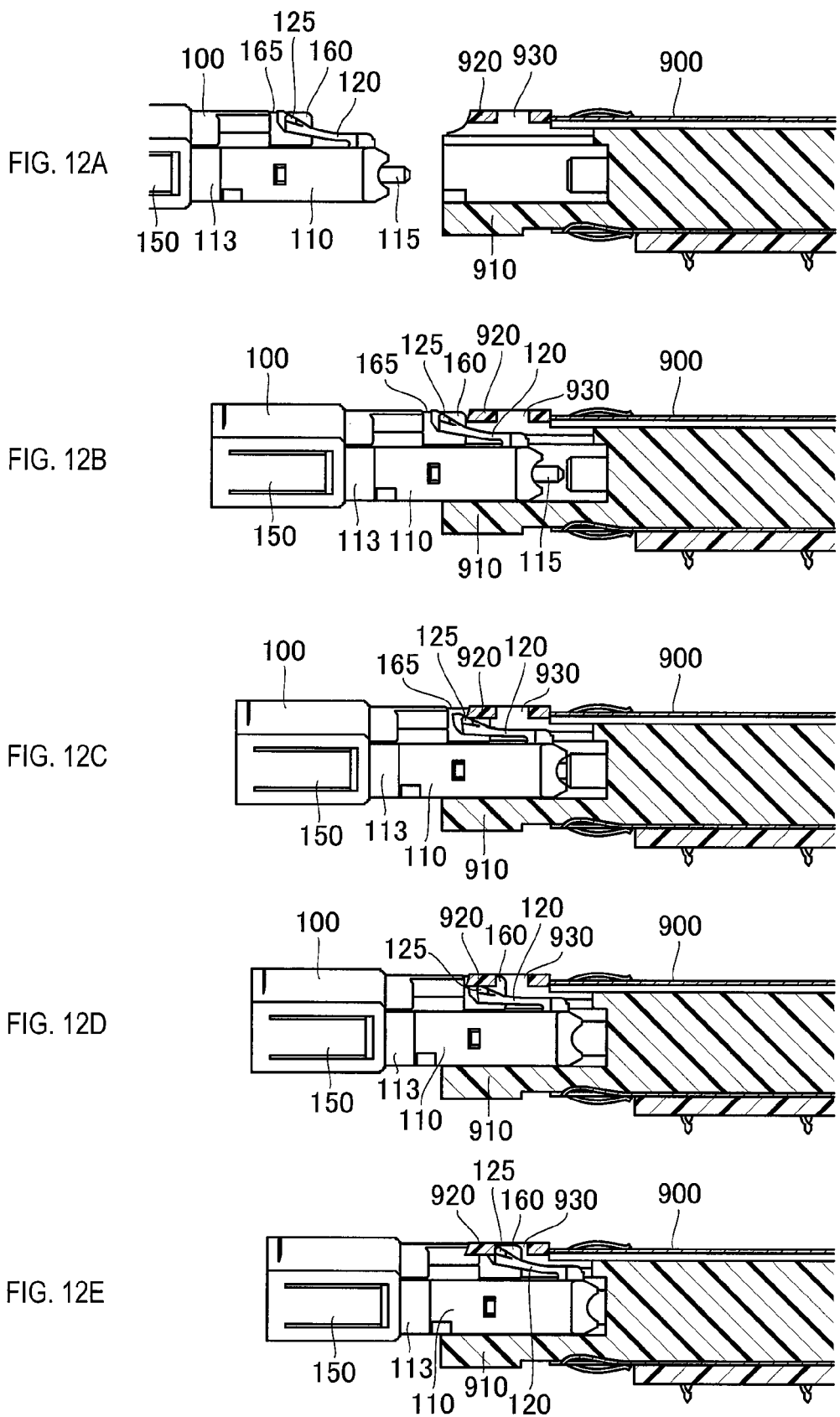
FIG. 12A shows a state before the optical connector 100 is inserted into the adapter 910 in a process of connecting the optical connector 100 and the adapter 910.
FIG. 12B shows that the optical connector 100 has been inserted a little into the adapter 910 in the process of connecting the optical connector 100 and the adapter 910.
FIG. 12C shows that the latch 120 has been pressed down in the process of connecting the optical connector 100 and the adapter 910.
FIG. 12D shows that the optical connector 100 has been inserted further with the latch 120 pressed down in the process of connecting the optical connector 100 and the adapter 910.
FIG. 12E shows that the optical connector 100 has been connected to the adapter 910 in the process of connecting the optical connector 100 and the adapter 910.

FIGS. 12A to 12E show how the optical connector 100 is connected to the adapter 910. The figures show sectional views of the module 900 taken along line B-B in FIG. 8. Connection is achieved by inserting the optical connector 100 into the adapter 910 as shown in FIGS. 12A to 12E. As the optical connector 100 is brought closer to the adapter 910, the latch 120 is pressed down by the pressing sections 920 disposed in the adapter 910 (FIGS. 12B, 12C, 12D). After the locking projections 125 pass through the pressing sections 920, the latch 120 returns to the original state, and the locking projections 125 fit in the latching sections 930 formed behind the pressing sections 920, causing the latch 120 to be locked in the adapter 910 (FIG. 12E).

Figure 13A:
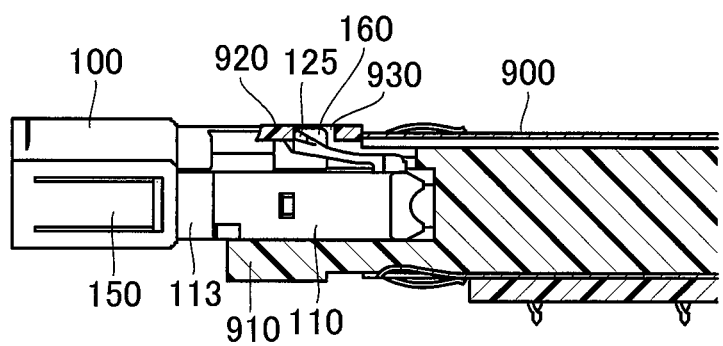
FIG. 13A shows that the optical connector 100 and the adapter 910 are connected in a process of disconnecting the optical connector 100 from the adapter 910.
Figure 13B:
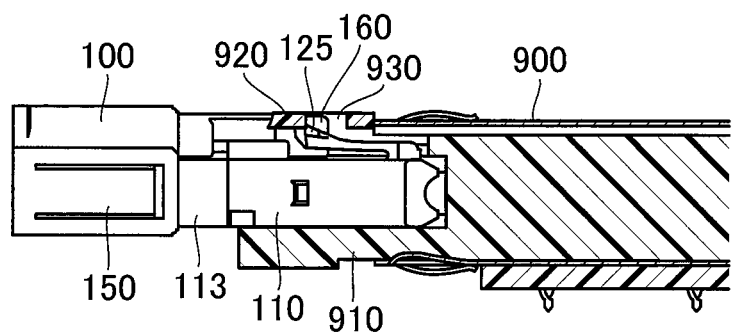
FIG. 13B shows that the latch 120 has been pressed down halfway in the process of disconnecting the optical connector 100 from the adapter 910.
Figure 13C:
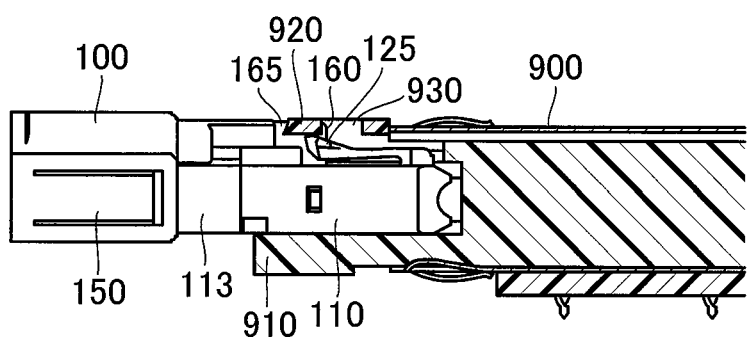
FIG. 13C shows that the latch 120 has been pressed down to a position where the optical connector 100 can be disconnected in the process of disconnecting the optical connector 100 from the adapter 910.

FIGS. 13A to 13C show how the optical connector 100 is detached from the adapter 910. The figures also show sectional views of the module 900 taken along line B-B in FIG. 8. When the slider 150 is pulled, the optical connector 100 is detached from the adapter 910, following the course shown in FIGS. 13A to 13C and 12C to 12A in that order. When the slider 150 is moved backward in the insertion direction against the force applied by the slider impelling section 170, the pressing projection 160 pushes down the latch 120 (FIGS. 13A and 13B). If the slider 150 is moved further, the latch state of the locking projections 125 and the adapter 910 is released (FIG. 13C). When the latch state is released, the force applied by the slider impelling section 170 moves the stopper 113 and the sleeve 110 backward in the insertion direction to the position shown in FIG. 12C. By moving back the slider 150 further in the insertion direction, the optical connector 100 can be completely detached from the adapter 910.

The latch 120 of the optical connector 100 has the notch 127. The coupling section 165 penetrating the notch 127 securely couples the pressing projection 160 disposed in the front of the latch 120 in the insertion direction (on the other side of the face 111) and the slider 150 disposed behind the latch 120. The locking projections 125 stick out of the mechanism (the pressing projection 160, the coupling section 165, and the slider 150) that presses the latch 120, and the mechanism that presses the latch 120 does not disturb the insertion of the optical connector 100 into the adapter 910. As the slider 150 is moved backward in the insertion direction, the latch 120 that is hidden in the adapter 910 in the connected state is pushed down. By moving back the slider 150 further, the optical connector 100 can be detached. The latch 120 has the locking projections 125 and the notch 127 in its back end 123. No other components need to be disposed farther from the face 111 than the locking projections 125. Therefore, the optical connector 100 can be detached in a single operation and can be reduced in diameter.

First Modification The connector described in the first embodiment was assumed to be an optical connector. Some electrical connectors such as telephone line connectors and LAN connectors have the same type of latch. By changing the ferrule 115 of the optical connector 100 to an electrical one and appropriately changing the shape of the entire connector (to balance the dimensions), electrical connectors can be embodied likewise, and the same effect can be produced.

Second Modification

An optical connector has been described in the first embodiment, and an electrical connector has been described in the first modification. Plugs incorporating those types of connectors can also be constructed. For example, the optical connector 100 shown in FIG. 4 needs to be disposed in a plug and the slider needs to be pulled when the plug is pulled on its outside. Alternatively, the slider needs to comprise an external part of the plug held by a person. The plug needs to be waterproof and dustproof.

What is claimed is:

1. A connector that is inserted into an adapter for connection therewith, the connector comprising:
   a sleeve;
   a latch formed in one face of the sleeve, comprising a front end in the insertion direction into the adapter serving as a fixed end, a back end serving as a free end, locking projections that protrude on both sides in the transverse direction in the back end, and a notch formed from the back end toward the front end;
   a stopper disposed behind the sleeve in the insertion direction and securely coupled with the sleeve;
   a slider disposed behind the sleeve in the insertion direction so as to be able to move backward in the insertion direction by a given distance with respect to the stopper;
   a pressing projection disposed at the position of the notch on the other side of the latch with respect to the one face and securely coupled with the slider by means of a coupling section penetrating the notch; and
   a slider impelling section that presses the slider toward the stopper in the insertion direction;
   when the connector is connected, the latch being pressed down by pressing sections provided in the adapter, returning to the original state after the locking projections pass through the pressing sections, and being locked in the adapter when the locking projections are positioned at latching sections formed behind the pressing sections;
   when the connector is detached from the adapter, the slider being moved backward in the insertion direction against the pressing force applied by the slider impelling section, causing the pressing projection to press down the latch to release the locking in the adapter.

2. The connector according to claim 1, wherein the coupling section is longer in the height direction, which is perpendicular to the one face, than in the width direction, which is parallel to the one face and perpendicular to the insertion direction.

3. The connector according to claim 1, wherein the connector is an optical connector.

4. The connector according to claim 3, wherein the adapter complies with IEC 61754-20.

5. The connector according to claim 2, wherein the connector is an optical connector.

6. The connector according to claim 5, wherein the adapter complies with IEC 61754-20.

7. A plug comprising a connector that is inserted into an adapter for connection therewith, the connector comprising:
   a sleeve;
   a latch formed in one face of the sleeve, comprising a front end in the insertion direction into the adapter serving as a fixed end, a back end serving as a free end, locking projections that protrude on both sides in the transverse direction in the back end, and a notch formed from the back end toward the front end;
   a stopper disposed behind the sleeve in the insertion direction and securely coupled with the sleeve;
   a slider disposed behind the sleeve in the insertion direction so as to be able to move backward in the insertion direction by a given distance with respect to the stopper;
   a pressing projection disposed at the position of the notch on the other side of the latch with respect to the one face and securely coupled with the slider by means of a coupling section penetrating the notch; and
   a slider impelling section that presses the slider toward the stopper in the insertion direction;
   when the connector is connected, the latch being pressed down by pressing sections provided in the adapter, returning to the original state after the locking projections pass through the pressing sections, and being locked in the adapter when the locking projections are positioned at latching sections formed behind the pressing sections;
   when the connector is detached from the adapter, the slider being moved backward in the insertion direction against the pressing force applied by the slider impelling section, causing the pressing projection to press down the latch to release the locking in the adapter.

8. The plug according to claim 7, wherein the coupling section is longer in the height direction, which is perpendicular to the one face, than in the width direction, which is parallel to the one face and perpendicular to the insertion direction.

9. The plug according to claim 7, wherein the connector is an optical connector.

10. The plug according to claim 9, wherein the adapter complies with IEC 61754-20.

11. The plug according to claim 8, wherein the connector is an optical connector.

12. The plug according to claim 11, wherein the adapter complies with IEC 61754-20.

* * * * *